June 3, 1941.  J. B. ARMITAGE  2,244,413
PRECISION INDICATING APPARATUS FOR MACHINE TOOLS
Filed Oct. 1, 1938  3 Sheets-Sheet 1
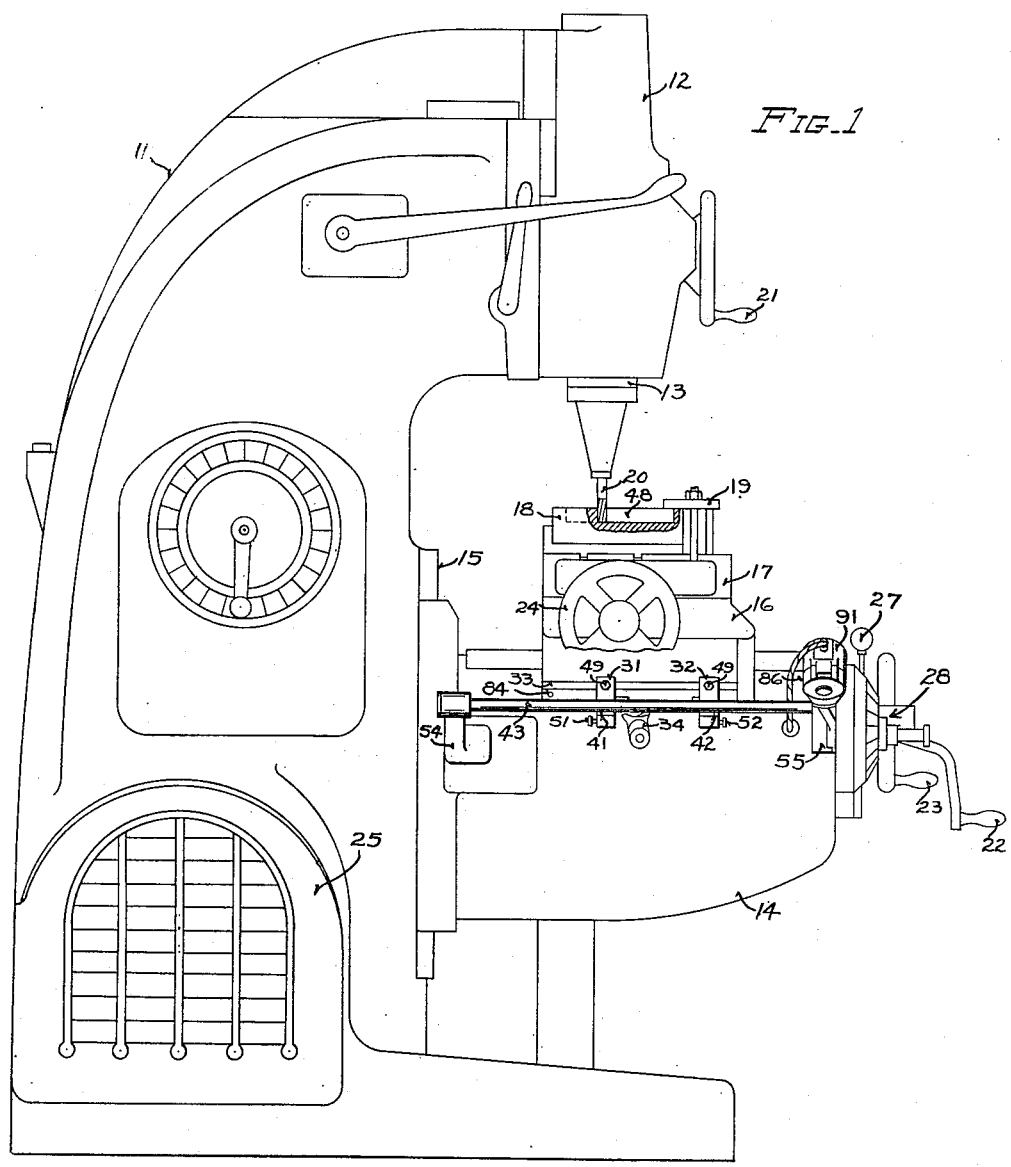
INVENTOR
JOSEPH B. ARMITAGE
BY W. D. O'Connor
ATTORNEY

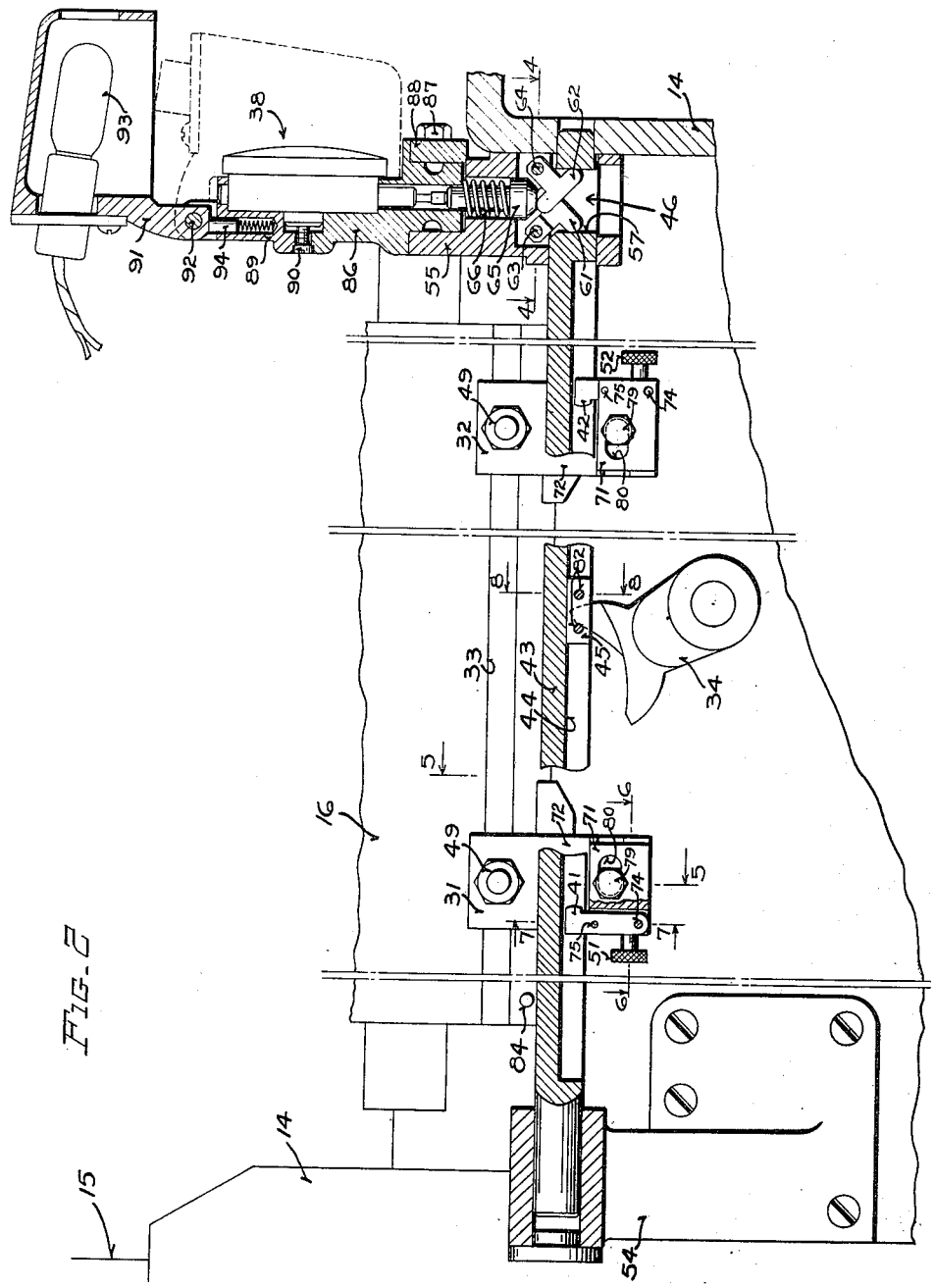

June 3, 1941.    J. B. ARMITAGE    2,244,413
PRECISION INDICATING APPARATUS FOR MACHINE TOOLS
Filed Oct. 1, 1938    3 Sheets-Sheet 3
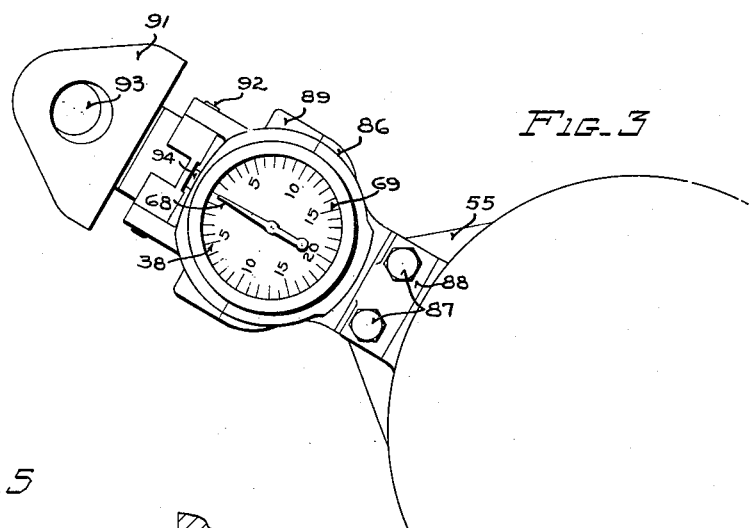
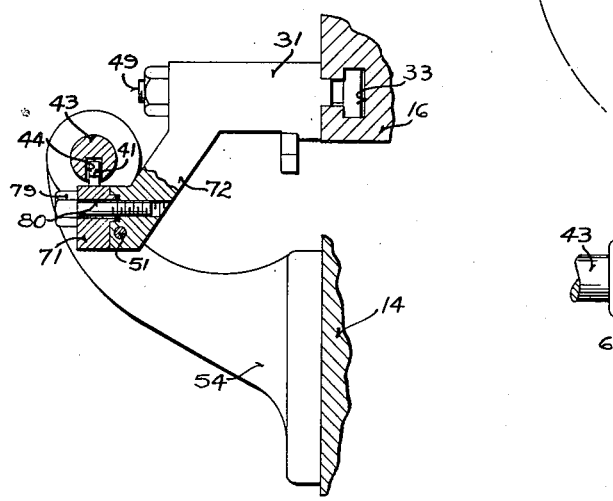
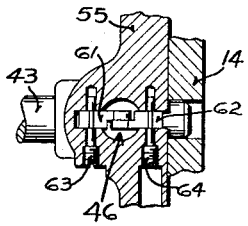
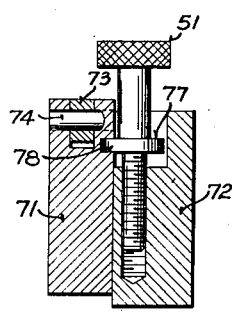
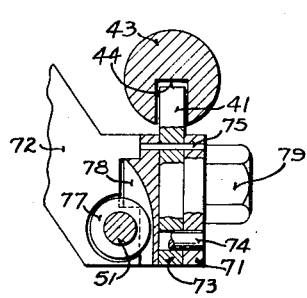
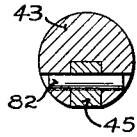
INVENTOR
JOSEPH B. ARMITAGE
BY W. D. O'Connor
ATTORNEY Patented June 3, 1941

2,244,413

UNITED STATES PATENT OFFICE 2,244,413

PRECISION INDICATING APPARATUS FOR MACHINE TOOLS

Joseph B. Armitage, Wauwatosa, Wis., assignor to Kearney & Trecker Corporation, West Allis, Wis., a corporation of Wisconsin Application October 1, 1938, Serial No. 232,844

24 Claims. (Cl. 90—21)

This invention relates, generally, to machine tools and more particularly to improved precision indicating apparatus for accurately indicating the position of a movable part of a machine tool.

A general object of the invention is to provide improved precision indicating means for accurately positioning a movable part of a machine tool.

A more specific object of the invention is to provide an improved indicator actuating means adapted to actuate an indicator in response to movement of a machine tool element to either end of its path of travel.

Another object is to provide an improved adjustable measuring abutment for a machine tool.

Another object is to provide a movable part of a machine tool with trip mechanism and indicator actuating mechanism adapted to function cooperatively to stop the movable part automatically and to indicate its position precisely at either end of its path of travel.

A further object is to provide an improved indicator actuating element which functions to guide and to afford protection to indicator actuating abutments carried by a movable part of a machine tool.

A still further object is to provide an improved indicator actuating motion transmitting mechanism.

According to this invention, a machine tool having a movable part is provided with improved means for indicating accurately the arrival of the movable part at a predetermined terminal position at either end of its path of movement. For this purpose the movable part is provided with two measuring abutments disposed to engage alternatively with an indicator actuating means that functions to operate a sensitive indicating device such as a dial indicator, the arrangement being such that the indicator is actuated in the same direction upon the engagement of either abutment with the actuating means. The indicator actuating means may include a rod provided with a longitudinal groove adapted to slidingly receive and protect the abutments carried by the movable part, a fixed stop being secured in the groove for engagement from opposite sides by the respective abutments. For controlling power movement of the machine tool part, trip mechanism is provided including a pair of trip dogs carried by the movable part and preferably arranged to stop the part automatically just prior to its arriving at the one or the other of its predetermined terminal positions, the part then being adjusted manually precisely to the predetermined position, as indicated accurately by the dial indicator. The indicator actuating abutments are preferably carried by the respective trip dogs for adjustment bodily with them relative to the movable part, each abutment also being individually adjustable relative to its supporting trip dog for the purpose of effecting the final precise adjustment of the indicating apparatus. The indicator is preferably mounted in manner to be rotatable for presenting its dial at any desired angle and motion transmitting mechanism is arranged to transmit the movement of the actuating rod to the indicator at any angular position thereof.

The foregoing and other objects of this invention, which will become more fully apparent from the following detailed specification, may be achieved by means of the particular precision indicating apparatus constituting an exemplifying embodiment of the invention as applied to a typical machine tool, that is illustrated in and described in connection with the accompanying drawings in which:

Figure 1 is a view in left side elevation of a milling machine equipped with indicating apparatus embodying the novel features of the present invention;

Fig. 2 is an enlarged detailed fragmentary view of the indicating apparatus and part of the supporting machine structure shown in Fig. 1, the indicating apparatus being shown largely in longitudinal section;

Fig. 3 is a fragmentary view in front elevation of the indicating apparatus, taken from the right in Fig. 2;

Fig. 4 is a detailed view of the indicator actuating fingers taken generally in horizontal section on the plane represented by the line 4—4 in Fig. 2;

Fig. 5 is a detailed view of a trip dog and part of the indicator actuating mechanism in transverse section taken on the plane represented by the line 5—5 in Fig. 2;

Fig. 6 is a detailed view in horizontal section of an adjustable measuring abutment in the indicator actuating mechanism taken generally on the plane represented by the line 6—6 in Fig. 2;

Fig. 7 is another detailed view of the measuring abutment taken in vertical transverse section on the plane represented by the line 7—7 in Fig. 2; and Fig. 8 is a detailed view in transverse section of the indicator actuating rod taken on the plane represented by the line 8—8 in Fig. 2.

Referring more specifically to the drawings, the particular machine tool there illustrated as exemplifying typical apparatus with which position indicating mechanism embodying the present invention may be utilized to advantage, is a milling machine of the vertical-spindle, knee-and-column type. As shown in Fig. 1, the machine comprises essentially an upstanding column structure 11 constituting the supporting base or frame of the machine and carrying at its upper forward end a vertically adustable spindle head 12 in which a vertically disposed tool carrying spindle 13 is journaled. Beneath the spindle 13 is arranged the usual work-supporting structure consisting of movable elements including a knee 14 slidably mounted for vertical adjustment along a forward face 15 of the column 11. The knee 14 is arranged to carry on its upper surface a saddle 16 slidably mounted for horizontal adjustment or cross feeding movement toward and from the column and carrying in turn a work-supporting table 17 slidably mounted for longitudinal horizontal feeding movement relative to the tool spindle 13.

Any suitable work-piece, such as the piece 18 illustrated in Fig. 1, may be supported on the table 17 and secured thereto by clamps 19 or the like in position to be engaged by a rotary cutting tool 20 mounted in the tool spindle 13. The cutting tool 20 may be fed downward into the workpiece by manipulating a hand crank 21 that functions to raise or lower the head 12, or the workpiece 18 may be raised vertically into engagement with the cutter by manipulating a hand crank 22 on the front of the knee 14 which serves to move the knee vertically along the face 15 of the column. Horizontal cross feeding movement of the work-piece may be effected manually by manipulating a hand wheel 23 which is operatively connected to move the saddle 16 along the top of the knee toward or from the column, and longitudinal horizontal feeding movement may be accomplished by manipulating a hand wheel 24 that moves the table 17 along the saddle 16.

These various feeding movements of the work-supporting structure and the spindle head may also be effected by power in well known manner, the power being supplied by a motor (not shown) housed in a motor compartment in the base of the column 11 made accessible by opening a louvered door 25, the motor functioning also to drive the tool spindle 13 in the usual manner. Power operation of the saddle 16, for example, in effecting horizontal cross feeding movement of the work-piece 18 relative to the cutter 20 in either direction, may be controlled manually by manipulating a control lever 27 which actuates a motion interrupting clutch that determines the direction and extent of the feeding movement, the rate of movement being established by a feed rate controlling lever and indicator mechanism 28 that functions to adjust the power transmission mechanism in well known manner. For limiting the extent of power movement of the saddle 16 in either direction automatically, tripping mechanism is provided including a pair of trip dogs 31 and 32, adjustably positioned in a T slot 33 in the left side of the saddle and disposed to engage alternatively with a tripping arm 34 operatively arranged to disconnect or interrupt the power driving mechanism from the saddle 16 when actuated by either trip dog.

Since the inertial forces existing in the saddle moving mechanism are different at different rates of feeding movement, and likewise other factors such as the frictional forces and the cutting force of the rotary tool differ under different conditions of operation, the position at which the work-piece 18 will stop relation to the tripping point when the power connection to the saddle driving mechanism is interrupted automatically by the trip mechanism will not be exactly the same each time the tripping operation occurs. Accordingly, in order to achieve exact positioning of the work-piece 18 after the saddle is stopped by the trip mechanism it is moved manually to its final terminal position under the guidance of an auxiliary sensitive precision indicating mechanism embodying the present invention that functions to indicate accurately the positioning of the work-piece 18 at either end of its path of travel in the cross feeding movement relative to the cutting tool 20.

As shown in the drawings, the particular position indicating apparatus there illustrated as a preferred embodiment of the invention, includes a sensitive precision indicating device or dial indicator 38 which may be of any well known commercial type. As shown in Fig. 1, the indicator 38 is disposed at the front of the knee and is operatively connected by motion transmitting mechanism to indicate accurately either predetermined terminal position of the work-piece 18 at the ends of its cross feeding movement. As best shown in Fig. 2, the indicator 38 is actuated when the saddle 16 is in the region of either predetermined terminus, by one or the other of a pair of measuring or indicator actuating abutments 41 and 42 each of which is adjustably carried by the saddle 16. The abutments 41 and 42 are arranged to cooperate with an indicator actuating rod 43 which is slidably carried by the knee 14 and disposed parallel with the path of movement of the saddle 16. As best shown in Fig. 2, the abutments 41 and 42 project upward into and slide within a groove or slot 44 in the lower side of the rod 43 in position to engage alternatively with opposite faces of an actuating element or stop block 45 secured in the slot 44, whereupon the rod 43 will be moved in the one or the other direction from its neutral or central position in accordance with further movement of the saddle 16. A motion translating mechanism 46 that is engaged with the forward end of the rod 43 functions to actuate the indicator 38 in the same manner regardless of the direction of movement of the rod from its neutral position.

In performing a machining operation such for instance as cutting a depression or slot 48 of predetermined length in the work-piece 18, each end of the cut may be established accurately and readily at a predetermined position by means of the precision indicating mechanism. For example, referring to Fig. 1, the work-piece 18 may be fed to the cutter 20 by power cross feeding movement of the saddle 16 at a predetermined feed rate, for instance in the outward or forward direction, until the trip dog 31 engages the trip arm 34 thereby disconnecting the power drive, the apparatus being preferably so adjusted that the saddle stops at a position near to but somewhat short of the predetermined terminal position. The feeding movement of the saddle 16 may then be continued manually by manipulating the hand wheel 23, the indicator actuating abutment 41 meanwhile coming into engagement with the stop block 45 on the actuating rod 43.

As shown in Fig. 2, the indicator actuating abutments 41 and 42 are preferably carried by the respective trip dogs 31 and 32 in such manner as to be bodily movable with them along the T slot 33. The trip dogs, being held in position by clamping bolts 49, are each roughly adjusted to approximately determined positions at which they effect automatic stopping of the cross feeding movement of the saddle in advance of the predetermined terminal positions at each end of the cut. The indicator actuating abutments 41 and 42 may then be adjusted individually and precisely, by means of adjusting screws 51 and 52, relative to their respective trip dogs to so place them that they effect accurate indications of the respective predetermined terminal positions.

When the accurately adjusted abutment 41, for instance, engages the indicator actuating stop block 45 in the course of forward movement of the saddle 16, it causes the actuating rod 43 to slide forward within a rear supporting bracket 54 and forward indicator supporting brackets 55, the bracket serving to support the respective ends of the rod and being in turn mounted on the knee 14. At its forward end within the bracket 55, the rod 43 is provided with a transverse opening or slot 57 adapted to receive and engage a pair of indicator actuating fingers 61 and 62 which are pivotally mounted on pins 63 and 64 respectively within the indicator bracket 55 in overlapping relationship as best shown in Fig. 4. The indicator fingers 61 and 62 constitute in effect a pair of bell cranks with one arm of each engaging the respective ends of the slot 57 in the rod 43. As shown in Fig. 2, the other arm of each crank or finger is engaged by the lower end of an indicator actuating plunger 65 which is urged downwardly by a spring 66 in manner to force the two fingers 61 and 62 into equalizing engagement with the respective ends of the slot 57, thereby urging the rod 43 to a central or neutral position. When the rod 43 is moved forward by engagement of the abutment 41 with block 45, the finger 61 is pivoted about the pin 63 in counter-clockwise direction as seen in Fig. 2 thereby moving the plunger 65 upward against the resistance of the spring 66. As shown, the upper end of the plunger 65 engages and actuates the downwardly extending stem of the indicator 38, any movement of the plunger is evidenced by the indicator in well known manner.

In order to finish the other end of the slot 48, at a predetermined position, the saddle 16 may be fed inwardly by power until the trip dog 32 engages the tripping arm 34 and causes it to disconnect the power driving mechanism as previously explained. The feeding movement is then continued manually, the indicator abutment 42 meanwhile moving into engagement with the forward end of the stop block 45. Continued movement of the saddle and the indicator abutment 42 then causes the actuating rod 43 to be moved rearwardly thereby pivoting the finger 62 about the pin 64 in clockwise direction and moving the indicator plunger 65 upward to actuate the indicator 38 in exactly the same manner that it was actuated upon forward movement of the rod 43 by the abutment 41. As best shown in Fig. 3, the indicator 38 is provided with a pointer 68 which operates over the face of a dial 69 that is preferably graduated in ten-thousandths of an inch, although the particular units of measurement indicated are not important. In setting the indicating mechanism, the actuating abutments 41 and 42 are individually adjusted in such manner that when the saddle 16 is moved to a point at which the pointer 68 indicates zero (or any other predetermined position) on the dial 69, the workpiece 18 will be accurately positioned at one of the predetermined terminals of its path of movement, the primary requirement of the indicator being that its response is sufficiently sensitive to indicate the predetermined position with the required degree of accuracy.

To provide for adjusting the indicator actuating abutments 41 and 42 with the required degree of accuracy, each abutment comprises primarily a plate or block 71 which is slidably mounted on the forward face of an arm 72 extending outward from the supporting trip dog, a tongue and groove connection being provided for insuring movement of the block parallel with the actuating rod 43. As shown in Fig. 5, each block 71 carries in a vertical groove an upwardly extending abutment supporting finger 73 which serves respectively to carry the measuring abutments 41 and 42. Each finger 73 is pivotally mounted at the lower edge of the block 71 by a pin 74 and is retained in vertical position by a shear pin 75 passing through the upper edge of the block 71 and holding the abutment finger in cooperating relationship with the stop block 45, the arrangement being such that in the event of accidental over-travel of the saddle 16, the pin 75 will shear and permit the abutment finger 73 to pivot about the pin 74 thereby avoiding injury to the indicating mechanism. As best shown in Figs. 5, 6 and 7 with respect to one trip dog, the adjusting screws 51 and 52 are each threaded in the extending arm 72 of the respective trip dog and each is provided with a collar 77 which engages a complementary groove 78 in the block 71 in such manner that rotation of the screw effects longitudinal adjustment of the block 71 and of the abutment finger 73 relative to the trip dog. After the adjustment has been effected, the block 71 may be clamped in adjusted position by tightening a clamping cap screw 79 which extends through a longitudinal slot 80 in the block and is threaded into the supporting arm 72.

As shown in Figs. 2 and 8, the stop block 45 is complementary to the groove 44 in the rod 43 and is secured therein by means of pins 82 extending transversely through the rod and the block. The stop block 45 may be of any predetermined length best adapted to the conditions of operation of the machine, and under some circumstances it may be found desirable to substitute a block of different length to meet some particular requirement of operation. To insure that the trip dog 31 will not be positioned so far to the rear of the saddle that it will interfere with other parts of the machine when the saddle is moved to its extreme inward position, a stop pin 84 is provided in the saddle near the end of the T slot 33 to limit the rearward movement of the dog.

As best shown in Figs. 2 and 3, the indicator 38 is mounted in an indicator housing 86 which is rotatably mounted in the indicator bracket 55 to turn about an axis concentric with the plunger 65 and the indicator stem, in such manner that the face of the indicator may be presented at the angle most convenient for the operator to observe the movement of the pointer 68 over the dial, the housing 86 then being clamped in the adjusted position by cap screws 87 acting upon a clamp 88. The indicating instrument 38, is retained within the housing 86 by means of a cap 89 which clamps over the upper part of the indicator casing, and by means of a screw 90 which extends through the back of the housing 86 and is threaded into the back of the indicator.

When the indicating mechanism is not in use, the indicator 38 is protected by a hinged cover 91 pivotally mounted on a pin 92 in the cap 89 and adapted when closed to completely cover and enclose the indicator dial, as shown in Fig. 1 and in dotted lines in Fig. 2. The cover 91 also serves as a housing for an electric light 93 which illuminates the dial of the indicator 38 when the cover is in the open position shown in Fig. 2, the cover being retained in the open position, whenever the indicating mechanism is in use, by means of a spring pressed plunger 94.

From the foregoing detailed description of a practical working embodiment of the invention, it will be apparent that there has been provided a useful and convenient indicating mechanism for precisely positioning a movable element of a machine tool at predetermined terminal points delimiting the ends of a definitely defined path of movement.

Although a single embodiment of the invention has been set forth in considerable detail to constitute a full disclosure, it is to be understood that persons skilled in the art may utilize the novel principles here taught in apparatus differing in construction from the particular mechanism herein described, without departing from the spirit and scope of the invention as defined in the subjoined claims.

The invention is hereby claimed as follows:

1. In a machine tool, in combination, a supporting structure, a member movably mounted on said supporting structure, means for moving said member by power in either direction selectively, a pair of trip dogs adjustably positioned on said movable member, trip mechanism disposed to be engaged by said trip dogs at predetermined positions in the path of movement of said member to disengage said power means automatically thereby terminating said power movement, a pair of indicator abutments adjustably mounted on said trip dogs respectively, an indicator actuating element disposed to be engaged by said abutments in the region of the termini of movement of said movable member, a sensitive indicating device arranged to be actuated by said element upon engagement thereof by either of said abutments, and means to adjust the position of said movable member in accordance with the indication of said indicating device, whereby said movable member may be stopped automatically and then accurately positioned at either terminus of a predetermined stroke of movement.

2. In a machine tool provided with a movable supporting member and power actuated driving means arranged to move said supporting member in either direction selectively, the combination with a trip mechanism operative to disconnect said power driving means, and a pair of trip dogs carried by said supporting member in position to engage said trip mechanism as said supporting member approaches the respective ends of its path of movement to stop said member automatically; of indicating mechanism including an indicator actuating element, a pair of indicator abutments carried by said supporting member and disposed to engage respectively with said indicator actuating element at the time said trip mechanism disconnects said power driving means at the end of power movement of said support in either direction, a sensitive indicating device arranged to be actuated by said actuating element in response to movement thereof by either of said indicator abutments, and means to adjust the position of said supporting member in accordance with the indication of said indicating device to position it accurately at either end of its path of movement.

3. In a machine tool provided with a supporting member movable in either direction along a predetermined path of movement, an indicator actuating element disposed adjacent to said path of movement, a pair of abutments mounted on said supporting member and disposed to engage said actuating element from opposite directions respectively as said supporting member approaches the respective ends of its path of movement, means to adjust the positions of said abutments relative to said supporting member individually, and a sensitive indicating device arranged to respond to movement of said indicator actuating element by either of said abutments in manner to indicate accurately either of two predetermined terminal positions at the respective ends of said path of movement.

4. In a machine tool provided with a supporting member adjustable along a path of movement to predetermined positions at each end thereof, motion transmitting mechanism disposed to respond to movement of said supporting member as it approaches each end of said path of movement, and a sensitive indicating device disposed to be actuated by said motion transmitting mechanism in manner to indicate accurately the predetermined positions defining respectively each end of said path of movement of said supporting member.

5. In a machine tool provided with a supporting member movable in either direction along a path of movement, a grooved indicator rod disposed adjacent to said path of movement, a stop member fixed in the groove of said rod, a pair of abutments adjustably mounted on said supporting member and disposed to slide within the groove of said rod in manner to engage the stop member fixed therein from opposite sides alternatively, and a sensitive indicating device associated with said indicator rod and operative in response to engagement of said stop member by either of said adjustable abutments to indicate a predetermined terminal position of said supporting member at either end of its path of movement in accordance with the adjustment of the corresponding adjustable abutment.

6. In a milling machine, the combination of a base, a tool supporting member carried by said base, a work supporting member carried by said base, said members being relatively bodily movable, transmission mechanism for effecting said relative movement including a motion interrupter, a shiftable trip part connected to operate said motion interrupter, a pair of trip elements adjustably positioned for shifting said trip part during said relative movement and respectively approximately determinative of terminal positions of said members, manual means operable for continuing said relative movement after each operation of said trip part, and means connected for operation in accordance with the relative movement of said supporting members in approaching either terminal position and operable for visibly indicating when said members arrive during the course of said continued movement at the one of said terminal positions corresponding with the last previously operating trip element.

7. In a machine tool, the combination with relatively movable supporting members, of power driven means connected to effect relative movement of said members, a shiftable trip device operative to disconnect said power driven means to stop said relative movement, a pair of trip elements adjustably positioned to engage and shift said trip device at points in the course of said relative movement approximately determinative of predetermined terminal positions of said members, manually operable means for continuing said relative movement after the operation of said trip device, and indicator means connected for operation in accordance with the relative movement of said members in the region of either terminal position and operative to indicate visibly the arrival of said members precisely at said predetermined terminal position.

8. In a milling machine, the combination of a base, a tool carrying member supported by said base, a work carrying member supported by said base, said members being relatively bodily movable, a transmission mechanism for effecting said relative movement including a motion interrupter, a shiftable trip element disposed to operate said motion interrupter, a pair of trip dogs disposed to engage and shift said trip element respectively at opposite ends of a predetermined course of relative movement and respectively approximately determinative of predetermined relative terminal positions of said members, manual means operable to continue said relative movement in the same direction after each operation of said trip element, and means visibly indicating when said members are positioned at the one or the other of said predetermined terminal positions during the course of continued movement by said manual means.

9. In a machine tool, the combination with relatively movable supporting members, of power driven means for effecting relative movement of said members, a tripping device operative in response to said relative movement to disconnect said power driven means, trip dogs disposed to engage said tripping device at opposite ends of a predetermined course of relative movement of said supporting members, manual adjusting means operable to continue said relative movement after the operation of said tripping device, and means to indicate visibly the arrival of said supporting members precisely at either of two predetermined terminal relative positions at the ends of said course of movement during adjustment by said manual means.

10. In a machine tool having a power driven movable part, in combination, a trip mechanism for controlling power movement of said part, a trip dog carried by said movable part for actuating said trip mechanism, a measuring abutment carried by said trip dog, means to adjust the position of said measuring abutment relative to said trip dog, and a sensitive indicating device disposed to be actuated by said measuring abutment and operative to indicate visibly the position of said movable part.

11. In a machine tool having a power driven movable part, in combination, a trip mechanism for controlling power movement of said part, a trip dog carried by said movable part for actuating said trip mechanism, a measuring abutment carried by said trip dog, means to adjust said trip dog relative to said movable part, means to adjust said measuring abutment relative to said trip dog, and a sensitive indicating device disposed to be actuated by said measuring abutment and operative to indicate visibly the position of said movable part.

12. In a machine tool having a member movable along a predetermined path, the combination with a sensitive indicating device for indicating the position of said movable member along said path, of an indicator actuating mechanism comprising a rod provided with a longitudinal groove disposed parallel with the path of movement of said member, an indicator actuating element fixed in said groove, an indicator actuating abutment carried by said movable member and disposed to move along said groove in said rod into engagement with said actuating element, and means operatively connecting said rod with said sensitive indicating device, whereby said indicating device may be actuated upon engagement of said actuating element by said abutment.

13. In a machine tool, a movable member, an indicating mechanism comprising an element adapted to be moved in either direction from a central position in response to movement of said movable member, a sensitive indicating device, and means operatively connecting said indicating device with said element in such manner that movement of said element in either direction from said central position results in a positive indication on said indicating device.

14. In a machine tool, the combination with a member movable selectively in opposite directions, of an indicating apparatus for accurately positioning said member at the termini of its path of movement, said apparatus comprising an indicator actuating element arranged to be moved in either direction from a neutral position, a sensitive indicating device, and means operative upon movement of said indicator actuating element in either direction from said neutral position to cause unidirectional movement of said indicating device.

15. In a machine tool comprising a stationary member and a movable member, power means for effecting movement of said movable member relative to said stationary member in either direction selectively, trip mechanism associated with said power means and operative to stop power movement of said movable member in either direction approximately at either of two accurately predetermined terminal positions, a sensitive indicator carried by said stationary member, means engageable by said movable member in the region of either of said two terminal positions for actuating said sensitive indicator, and means for adjusting the position of said movable member in accordance with the indications of said sensitive indicator to place it precisely in said accurately predetermined terminal position.

16. In a machine tool, the combination with a movable member, of an indicating mechanism including an indicator actuating rod disposed to respond to movement of said member in either direction, an indicator carrying bracket mounted on said machine, a dial indicator, means for mounting said dial indicator on said bracket, and means for transmitting movement of said actuating rod to said dial indicator in manner to actuate said indicator in the same direction regardless of the direction of movement of said rod by said movable member.

17. In a machine tool having a movable member, indicating mechanism for indicating the position of said movable member, comprising a sensitive dial indicator, an indicator actuating rod disposed to be engaged and moved by said movable member in either direction from a neutral position, an indicator actuating plunger disposed at right angles to said actuating rod, means to move said plunger in the same direction in response to movement of said rod in either direction from said neutral position, and means supporting said sensitive dial indicator in position to be acted upon by said plunger.

18. In a machine tool having a movable member, indicating mechanism for indicating the position of said movable member, comprising an indicator actuating rod disposed to be engaged and moved by said movable member, a pair of pivotally mounted bell cranks disposed to be actuated respectively by said rod upon movement thereof in opposite directions from a neutral position, and a sensitive indicating device disposed to be actuated by one or the other of said bell cranks alternatively depending upon the direction of movement of said actuating rod from said neutral position.

19. In a machine tool having a power driven movable part, tripping mechanism for controlling power movement of said part, a trip dog adjustably carried by said movable part in position to engage and actuate said tripping mechanism, a measuring abutment slidably mounted on said trip dog, and an adjusting screw disposed to move said measuring abutment relative to said trip dog for accurately adjusting the position of said abutment, whereby said movable part may be stopped automatically at a position approximately determined by adjustment of said trip dog and then moved to a final position precisely predetermined by adjustment of said measuring abutment on said trip dog.

20. In a milling machine, the combination with a column, a knee slidably mounted for vertical movement along said column, and a saddle slidably mounted for horizontal movement along said knee, of precision indicating apparatus for positioning said saddle at precisely predetermined terminal points defining each end of its path of movement, including motion transmitting mechanism disposed to respond to movement of said saddle as it approaches either of said terminal points, and a sensitive movement indicating device disposed to be actuated by said motion transmitting mechanism in response to movement of said saddle in the region of either terminal point and operative to indicate accurately the arrival of said saddle precisely at said predetermined terminal point.

21. In a milling machine having a column and a slidably mounted saddle supported by said column, in combination, power driven means for moving said saddle in either direction, trip mechanism arranged to disengage said power driven means automatically in the region of either of two predetermined terminal positions at the ends of the path of movement of said saddle, and a single sensitive indicating device operatively connected to indicate precisely either of said predetermined terminal positions after said power driven means has been disengaged.

22. In a machine tool, a frame, a supporting member arranged for movement relative to said frame, manually operable means for adjusting the position of said supporting member, power driving mechanism selectively connectable to move said supporting member in the one or the other direction, trip mechanism associated with said supporting member and operative to disengage said power driving mechanism upon said supporting member being moved thereby to either end of a predetermined path of travel, and precision indicating apparatus associated with said trip mechanism and operative to indicate precisely the position of said supporting member in the region of either end of its path of travel, whereby said member may be adjusted manually after operation of said trip mechanism to a precisely predetermined terminal position by observing said indicating apparatus while actuating said manually operable adjusting means.

23. A machine tool comprising a supporting structure, a working member movably mounted on said supporting structure, manually operable means for adjusting the position of said working member, power driven mechanism operatively connectable to move said working member in either direction selectively, trip mechanism associated with said working member and operative to disconnect said power driven mechanism when said working member is moved thereby to either end of a predetermined path of power movement, and a precision indicating device operatively associated with said trip mechanism and functioning to indicate precisely the position of said working member in the region of either end of its path of movement, whereby said working member may be moved by power in either direction and automatically stopped in the region of a predetermined terminal position at either end of its path of travel and then adjusted manually precisely to the predetermined terminal position as indicated by said precision indicating device.

24. In a machine tool, the combination with a fixed support and a movable element carried by said fixed support, of power driven means for effecting movement of said element alternatively in opposite directions relative to said fixed support, trip mechanism operative upon movement of said movable element to either of two terminal positions to disengage said power driven means automatically, a sensitive indicating device carried by said fixed support, an indicator actuating mechanism including means arranged to act upon said indicating device in the same manner when moved in either direction, means adjustably mounted on said movable element for engaging said indicator actuating means in each of said terminal positions, and means to adjust said movable element in the region of either terminal position to position it accurately in predetermined relationship with said fixed support in accordance with the indication of said indicating device.

JOSEPH B. ARMITAGE.